US012603853B2

(12) United States Patent
Sharma

(10) Patent No.: US 12,603,853 B2
(45) Date of Patent: Apr. 14, 2026

(54) EMAIL MANAGEMENT ENGINE IN AN ELECTRONIC MAIL SYSTEM

(71) Applicant: Microsoft Technology Licensing, LLC, Redmond, WA (US)

(72) Inventor: Mrinal Kumar Sharma, Noida (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 51 days.

(21) Appl. No.: 18/426,731

(22) Filed: Jan. 30, 2024

(65) Prior Publication Data

US 2025/0247343 A1 Jul. 31, 2025

(51) Int. Cl.
*H04L 51/02* (2022.01)
*G06F 40/40* (2020.01)
(Continued)

(52) U.S. Cl.
CPC .............. *H04L 51/02* (2013.01); *G06F 40/40* (2020.01); *G06Q 10/107* (2013.01); *G06Q 10/1097* (2013.01)

(58) Field of Classification Search
CPC ....... H04L 51/02; G06F 40/40; G06Q 10/107; G06Q 10/1097
See application file for complete search history.

(56) References Cited

U.S. PATENT DOCUMENTS

2004/0249934 A1 12/2004 Anderson
2007/0071209 A1 3/2007 Horvitz
(Continued)

FOREIGN PATENT DOCUMENTS

| EP | 2264958 A1 | 12/2010 |
| EP | 2325785 A1 | 5/2011 |
| WO | 2019191337 A1 | 10/2019 |

OTHER PUBLICATIONS

"Out of office/Vacation reply to senders", Retrieved from the URL: https://www.zoho.com/mail/help/out-of-office-autoresponder.html, Jul. 31, 2023, 9 Pages.

(Continued)

*Primary Examiner* — Suraj M Joshi
(74) *Attorney, Agent, or Firm* — Shook, Hardy & Bacon L.L.P.

(57) ABSTRACT

Methods, systems, and computer storage media for providing context-aware out-of-office (OOO) assistance using an email management engine. Context-aware OOO assistance supports email management operations that provide OOO functionality with artificial intelligence and context-awareness for email management during periods of unavailability. In operation, an email message is accessed. An email message category is determined for the email message. The email message category can be a scheduling meeting category, a requesting information category, or a task delegation category. Based on the email message category, a plurality of OOO operations associated with the email message category are executed. Based on executing the plurality of OOO operations associated with the email message category, a response for the email message is generated. The response is associated with one of the following: scheduling meeting data, requesting information data, or task delegation data. The response is communicated to cause display of the response on an email interface.

20 Claims, 14 Drawing Sheets

(51) Int. Cl.
   G06Q 10/107        (2023.01)
   G06Q 10/109        (2023.01)

(56)                    References Cited

U.S. PATENT DOCUMENTS

| | | |
|---|---|---|
| 2013/0067000 A1 | 3/2013 | Brauninger et al. |
| 2016/0217429 A1 | 7/2016 | Lau et al. |
| 2018/0167341 A1 | 6/2018 | Bs |
| 2018/0253659 A1 | 9/2018 | Lee et al. |
| 2019/0182185 A1 | 6/2019 | Miklos |
| 2020/0106732 A1* | 4/2020 | Keenan, II ........... G06Q 10/107 |
| 2022/0166731 A1* | 5/2022 | Rey ........................ G06Q 10/10 |
| 2022/0263935 A1 | 8/2022 | Vaananen |

OTHER PUBLICATIONS

The Extended European Search Report Received in European Patent Application No. 25151850.2, mailed on Jun. 4, 2025, 10 pages.

* cited by examiner

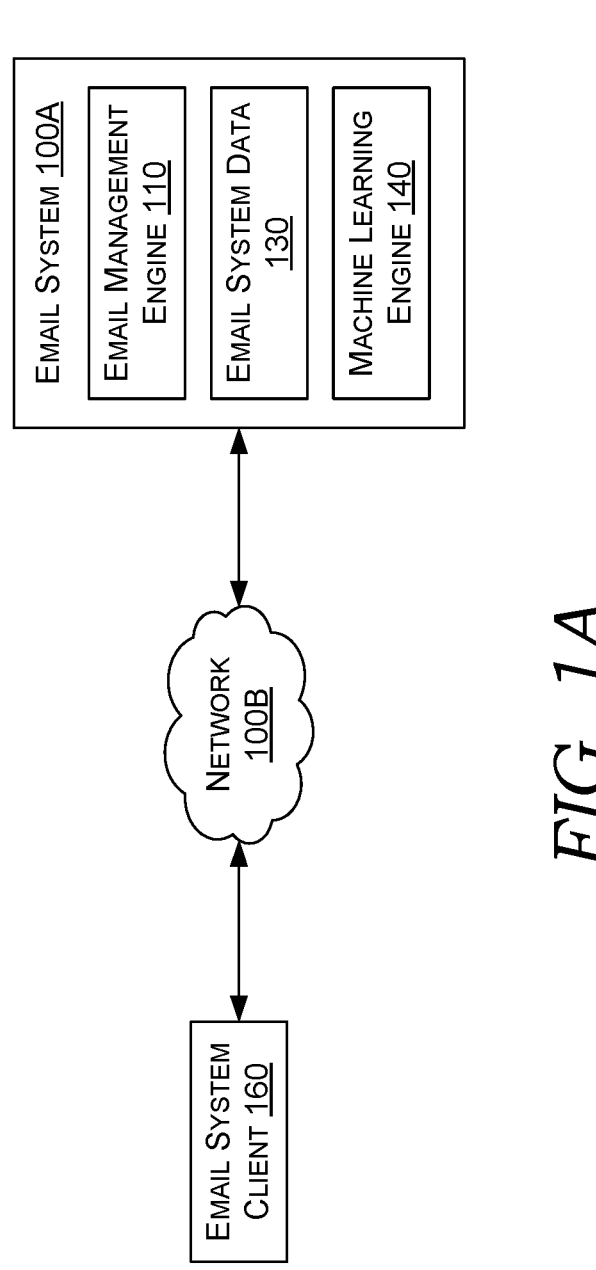
*FIG. 1A*

Figure 1C:
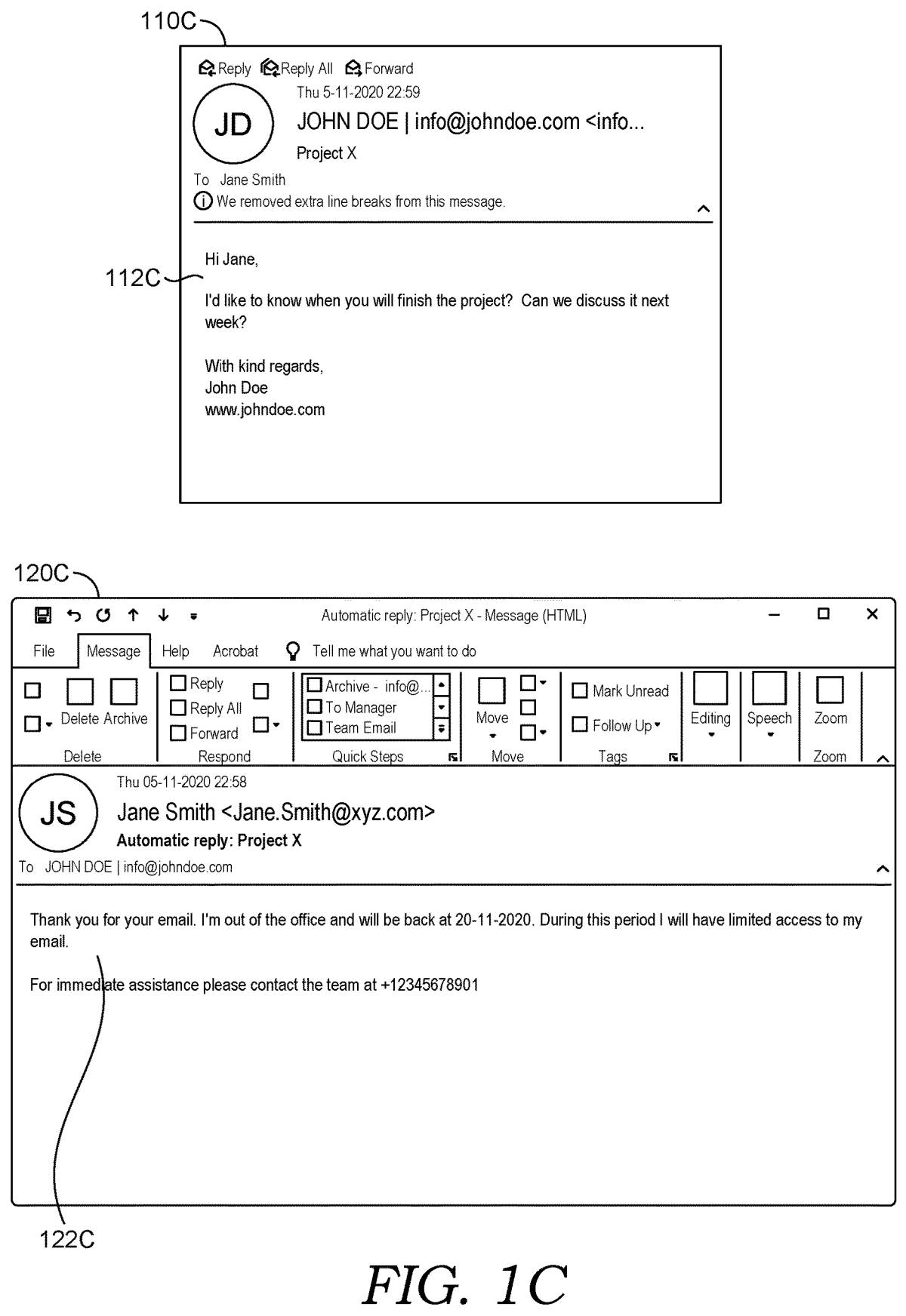

110C

Reply    Reply All    Forward

Thu 5-11-2020 22:59

JD    JOHN DOE | info@johndoe.com <info...

Project X

To   Jane Smith

ⓘ We removed extra line breaks from this message.    ⌃

Hi Jane,

112C

I'd like to know when you will finish the project?  Can we discuss it next week?

With kind regards,
John Doe
www.johndoe.com

120C

| 🖫 ↶ ↻ ↑ ↓ ≡ | Automatic reply: Project X - Message (HTML) | — ☐ ✕ |
|---|---|---|

File    Message    Help    Acrobat    ♀ Tell me what you want to do

☐  ☐  ☐  ☐ Reply  ☐  ☐ Archive - info@...  ▲  ☐  ☐▾  ☐ Mark Unread  ☐  ☐  ☐
☐▾ Delete Archive  ☐ Reply All    ☐ To Manager  ▼  Move ☐  ☐ Follow Up▾  Editing  Speech  Zoom
☐ Forward ☐▾  ☐ Team Email  ☰  ☐▾

Delete          Respond          Quick Steps  ⌐|          Move          Tags  ⌐|          Zoom  ⌐|  ⌃

Thu 05-11-2020 22:58

JS    Jane Smith <Jane.Smith@xyz.com>

Automatic reply: Project X

To   JOHN DOE | info@johndoe.com    ⌃

Thank you for your email. I'm out of the office and will be back at 20-11-2020. During this period I will have limited access to my email.

For immediate assistance please contact the team at +12345678901

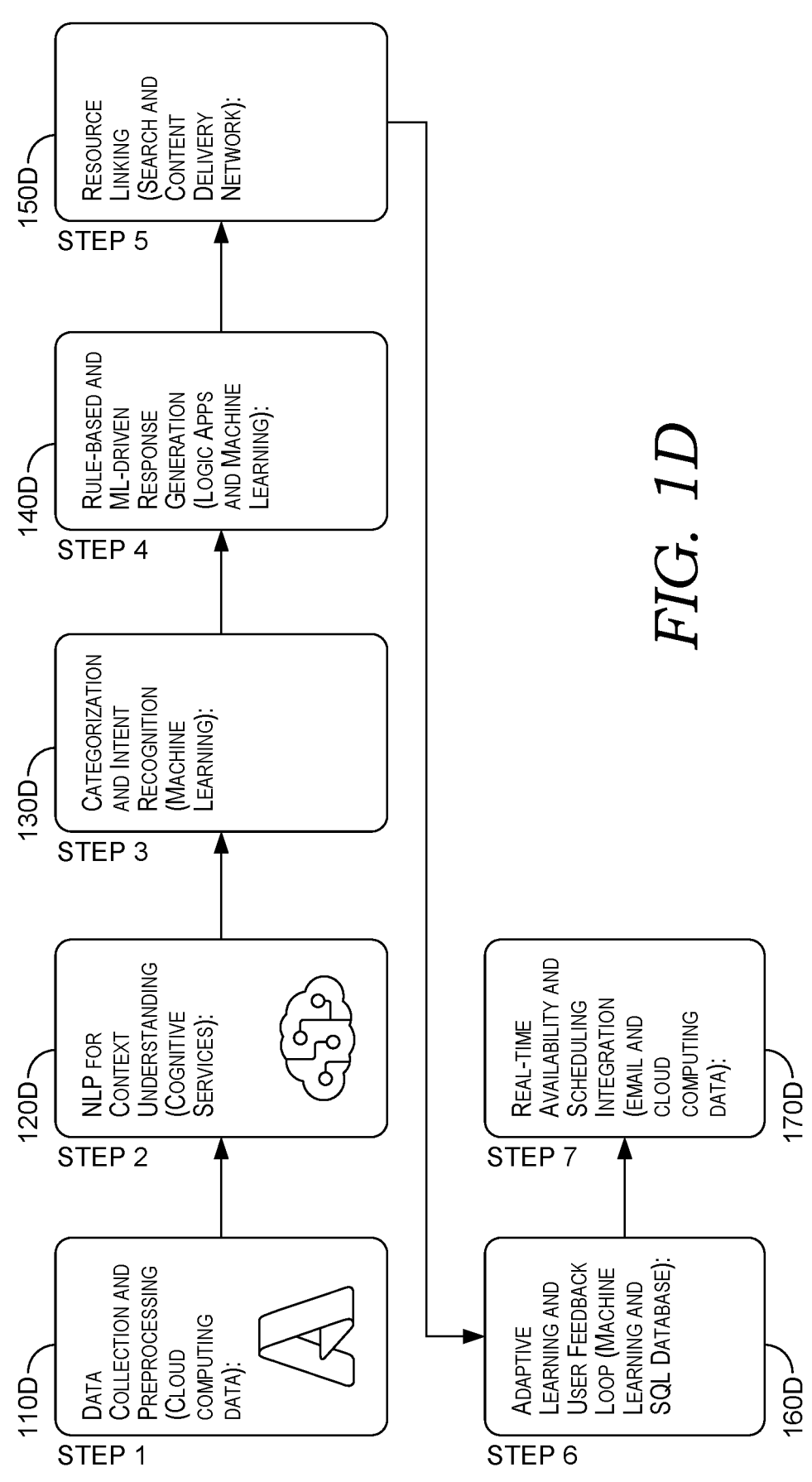

110D

STEP 1

DATA COLLECTION AND PREPROCESSING (CLOUD COMPUTING DATA):

120D

STEP 2

NLP FOR CONTEXT UNDERSTANDING (COGNITIVE SERVICES):

130D

STEP 3

CATEGORIZATION AND INTENT RECOGNITION (MACHINE LEARNING):

140D

STEP 4

RULE-BASED AND ML-DRIVEN RESPONSE GENERATION (LOGIC APPS AND MACHINE LEARNING):

150D

STEP 5

RESOURCE LINKING (SEARCH AND CONTENT DELIVERY NETWORK):

160D

STEP 6

ADAPTIVE LEARNING AND USER FEEDBACK LOOP (MACHINE LEARNING AND SQL DATABASE):

170D

STEP 7

REAL-TIME AVAILABILITY AND SCHEDULING INTEGRATION (EMAIL AND CLOUD COMPUTING DATA):

EMAIL SYSTEM 100A

EMAIL MANAGEMENT ENGINE 110

EMAIL CATEGORY OPERATIONS 112

LINKED RESOURCE DATA 114

CATEGORIZATION ENGINE 120

CONTEXT-AWARE DYNAMIC RESPONSE ENGINE 122

RESOURCE LINKING ENGINE 124

ADAPTIVE LEARNING AND FEEDBACK ENGINE 126

EMAIL SYSTEM DATA 130

MACHINE LEARNING ENGINE 140

MACHINE LEARNING MODELS 142

EMAIL SYSTEM CLIENT 160

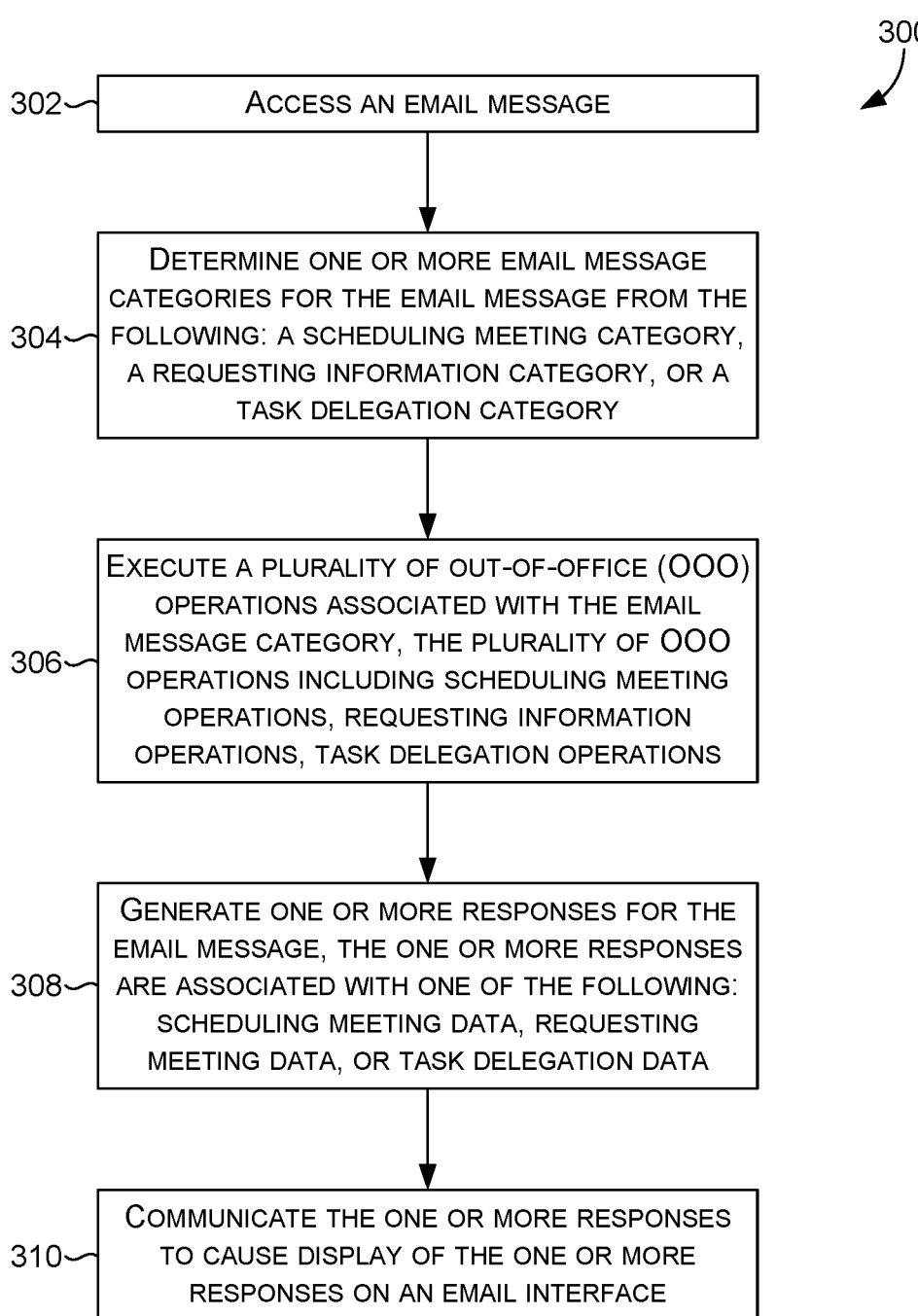

300

302~ ACCESS AN EMAIL MESSAGE

304~ DETERMINE ONE OR MORE EMAIL MESSAGE CATEGORIES FOR THE EMAIL MESSAGE FROM THE FOLLOWING: A SCHEDULING MEETING CATEGORY, A REQUESTING INFORMATION CATEGORY, OR A TASK DELEGATION CATEGORY

306~ EXECUTE A PLURALITY OF OUT-OF-OFFICE (OOO) OPERATIONS ASSOCIATED WITH THE EMAIL MESSAGE CATEGORY, THE PLURALITY OF OOO OPERATIONS INCLUDING SCHEDULING MEETING OPERATIONS, REQUESTING INFORMATION OPERATIONS, TASK DELEGATION OPERATIONS

308~ GENERATE ONE OR MORE RESPONSES FOR THE EMAIL MESSAGE, THE ONE OR MORE RESPONSES ARE ASSOCIATED WITH ONE OF THE FOLLOWING: SCHEDULING MEETING DATA, REQUESTING MEETING DATA, OR TASK DELEGATION DATA

310~ COMMUNICATE THE ONE OR MORE RESPONSES TO CAUSE DISPLAY OF THE ONE OR MORE RESPONSES ON AN EMAIL INTERFACE

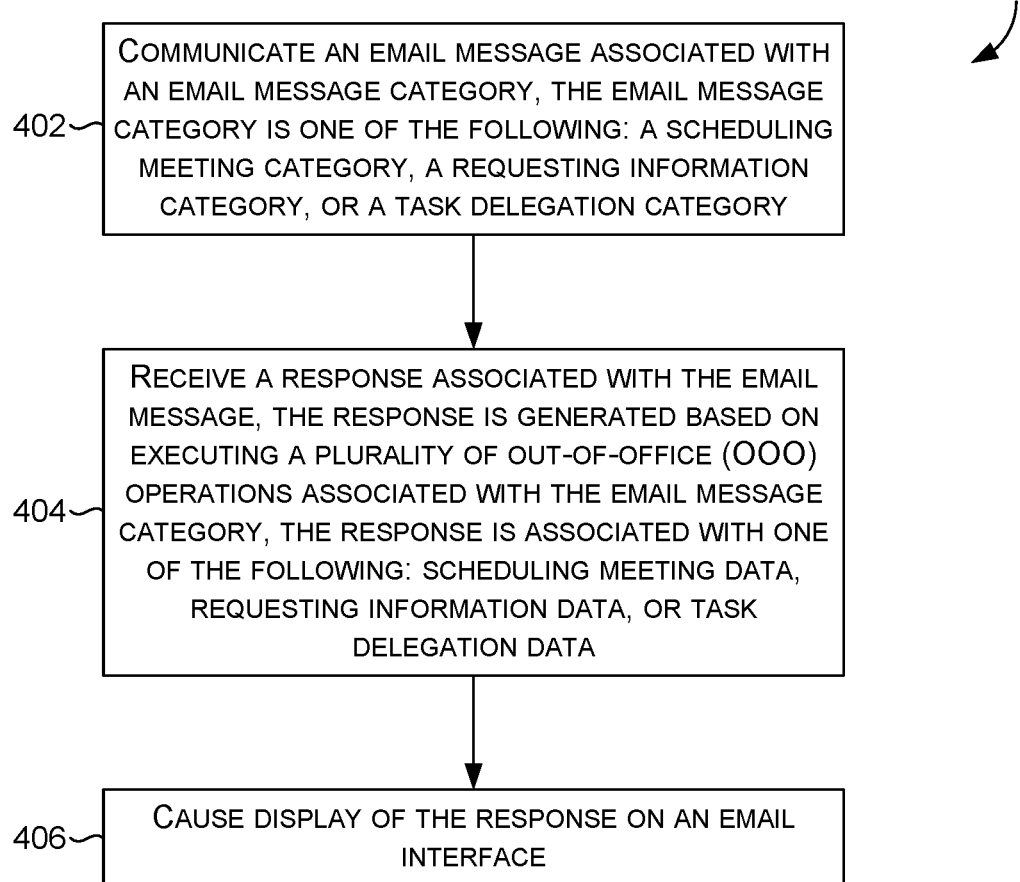

402 — COMMUNICATE AN EMAIL MESSAGE ASSOCIATED WITH AN EMAIL MESSAGE CATEGORY, THE EMAIL MESSAGE CATEGORY IS ONE OF THE FOLLOWING: A SCHEDULING MEETING CATEGORY, A REQUESTING INFORMATION CATEGORY, OR A TASK DELEGATION CATEGORY

404 — RECEIVE A RESPONSE ASSOCIATED WITH THE EMAIL MESSAGE, THE RESPONSE IS GENERATED BASED ON EXECUTING A PLURALITY OF OUT-OF-OFFICE (OOO) OPERATIONS ASSOCIATED WITH THE EMAIL MESSAGE CATEGORY, THE RESPONSE IS ASSOCIATED WITH ONE OF THE FOLLOWING: SCHEDULING MEETING DATA, REQUESTING INFORMATION DATA, OR TASK DELEGATION DATA

406 — CAUSE DISPLAY OF THE RESPONSE ON AN EMAIL INTERFACE

FIG. 4

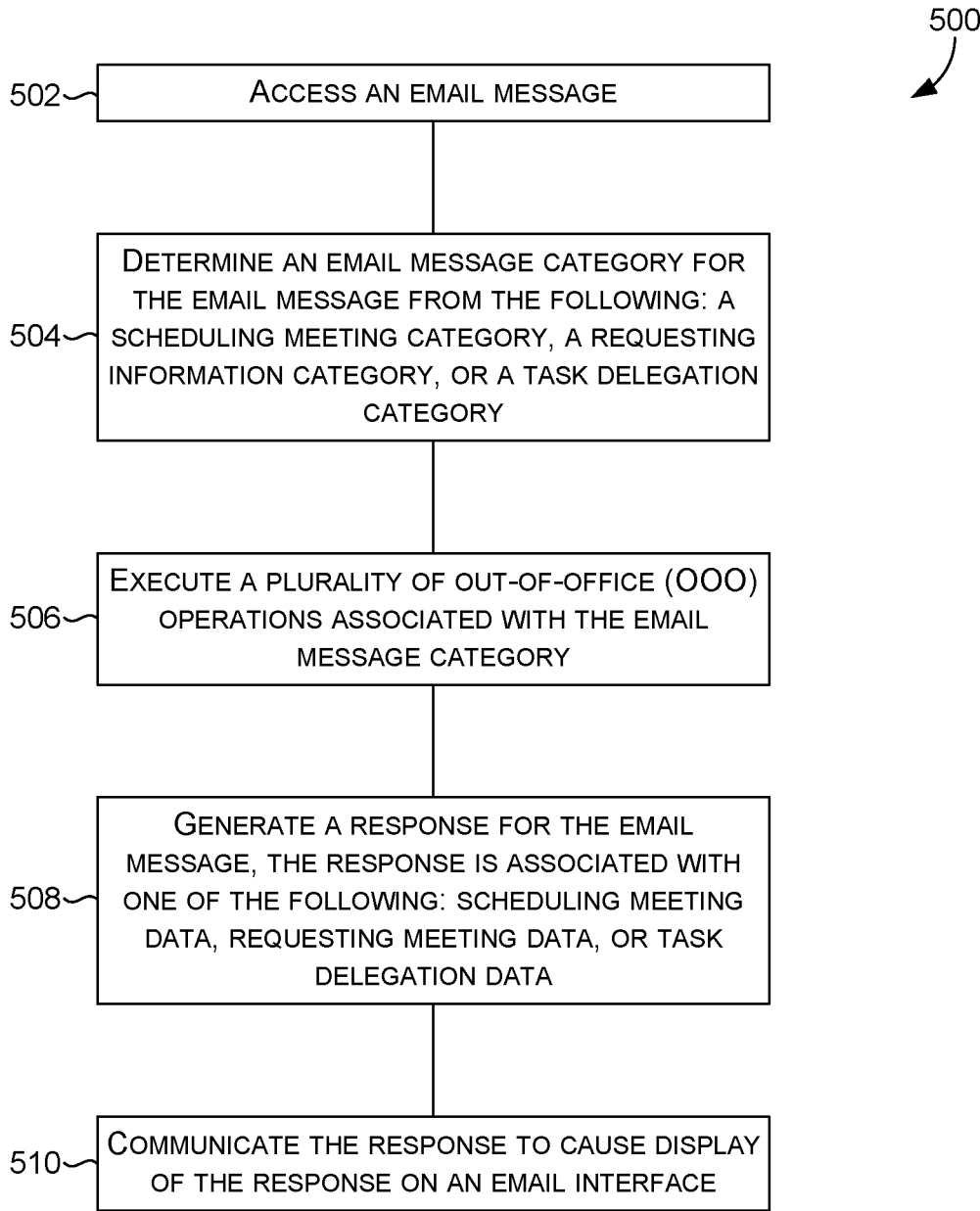

502 — ACCESS AN EMAIL MESSAGE

504 — DETERMINE AN EMAIL MESSAGE CATEGORY FOR THE EMAIL MESSAGE FROM THE FOLLOWING: A SCHEDULING MEETING CATEGORY, A REQUESTING INFORMATION CATEGORY, OR A TASK DELEGATION CATEGORY

506 — EXECUTE A PLURALITY OF OUT-OF-OFFICE (OOO) OPERATIONS ASSOCIATED WITH THE EMAIL MESSAGE CATEGORY

508 — GENERATE A RESPONSE FOR THE EMAIL MESSAGE, THE RESPONSE IS ASSOCIATED WITH ONE OF THE FOLLOWING: SCHEDULING MEETING DATA, REQUESTING MEETING DATA, OR TASK DELEGATION DATA

510 — COMMUNICATE THE RESPONSE TO CAUSE DISPLAY OF THE RESPONSE ON AN EMAIL INTERFACE

EMAIL MANAGEMENT ENGINE IN AN ELECTRONIC MAIL SYSTEM

BACKGROUND

Users rely on computing environments with applications and services to accomplish computing tasks. Distributed computing systems (or cloud computing platforms) host and support different types of applications and services in managed computing environments. In particular, a cloud computing platform can implement an electronic mail system that enables the exchange of digital messages between users. For example, an electronic mail system can facilitate the communication of text-based messages, files, and other data over the internet. Emails have become a primary mode of communication for both personal and professional matters. An electronic mail system can include an out-of-office (OOO) feature or functionality that allows users to automatically respond to incoming emails when they are unavailable or out of the office. This feature is particularly useful for informing colleagues, clients, or other contacts about a person's absence and providing alternative contacts or information.

SUMMARY

Various aspects of the technology described herein are generally directed to systems, methods, and computer storage media for, among other things, providing context-aware out-of-office (OOO) assistance using an email management engine. Context-aware OOO assistance supports email management operations that provide out-of-office functionality with advanced artificial intelligence (AI) capabilities and context-awareness for efficient email management during periods of unavailability. In particular, the context-aware OOO assistance includes actively assisting email senders with OOO guidance that includes information and resources that the email senders need. The context-aware OOO assistance can provide OOO guidance for email messages associated with scheduling meetings, information requests, and task assignments.

The email management engine operates based on an email management workflow that includes a scheduling meeting workflow, an information request workflow, and a task assignment workflow. By way of illustration, when it comes to scheduling meetings, an OOO assistant provides real-time availability information and suggests alternative contacts-ensuring seamless meeting scheduling. For information requests, the OOO assistant can access and provide the requested information and making requested information readily available to a user. And, for task assignments, the OOO assistant offers the option to delegate tasks to the right users (e.g., colleagues)—ensuring tasks do not get stuck in the absence of the recipient. The email management workflow is associated with a computing framework that includes AI-driven categorization, context-aware dynamic responses, resource links and document access.

Conventionally, electronic mail systems are not configured with comprehensive computing logic and infrastructure to effectively support email management for users that are unavailable or out of the office. An OOO can be designed to automatically respond to incoming emails to users when the users are unavailable or out of the office. The feature is particularly useful for information colleagues, clients, or other contacts about a person's absence and providing alternative contacts or information. Traditional OOO messages are often generic and may lack context sensitivity.

These messages provide a standard response to all incoming emails during the specified period, which may not address the specific need or urgency of different senders. Conventional OOO assistance may not be ideal for collaborative work, for example, in environments where collaboration is key, relying solely on OOO responses may lead to delays and hinder teamwork. Team members might need alternative means to stay informed about each other's responsibilities. Moreover, a conventional OOO may not adequately support customization, in that, while users can customize the OOO messages to some extent, the level of customization may be limited. Users might not have the flexibility to tailor responses based on specific criteria or the nature of incoming emails.

A technical solution—to the limitations of conventional electronic mail systems—can include providing email management operations and interfaces via an email management engine that support context-aware out-of-office assistance in an electronic mail system. Email management operations can include AI-driven categorization, context-aware dynamic responses, and resource links and document access. For AI-driven categorization, when an OOO assistant is activated, the OOO assistant uses advanced AI algorithms to categorize incoming emails based on their content and sender. The OOO assistant recognizes if an email is of a particular email type (e.g., client query, a team collaboration request, a resource request, or a general communication, among other categories). With the context-aware dynamic responses, for each category of email, the OOO assistant is designed to generate context-aware responses. Instead of a generic notification of unavailability, the AI generates responses that guide the email sender based on their specific needs. For instance, it can provide a link to relevant documentation, forward the email to a colleague, or suggest alternative contacts.

And, for resource links and document access, if the sender is looking for specific documents, webpages, or resources, the OOO assistant can provide direct links to these materials. For example, if a client requests a product brochure, the OOO assistant generates an email response with a link to the latest brochure. The email management engine leverages the power of AI and context awareness to transform the traditional OOO message into a dynamic, responsive, and user-centric communication tool. The email management engine addresses the challenges posed by email overload, the need for quick and relevant responses, and the expectations for efficient email management in both personal and professional contexts, especially in large organizations.

In operation, in a first embodiment, an email message is accessed. An email message category is determined for the email message. The email message category is one of the following: a scheduling meeting category, a requesting information category, or a task delegation category. Based on the email message category, a plurality of OOO operations associated with the email message category are executed. Based on executing the plurality of OOO operations associated with the email message category, a response for the email message is generated. The response is associated with one of the following: scheduling meeting data, requesting information data, or task delegation data. The response is communicated to cause display of the response on an email interface.

In a second embodiment, an email message associated with an email message category is communicated. The email message category is one of the following: a scheduling meeting category, a requesting information category, or a task delegation category. Based on communicating the email message, a response is received. The response is associated with the email message. The response is generated based on executing a plurality of OOO operations associated with the email message category. The response is associated with one of the following: scheduling meeting data, requesting information data, or task delegation data. The response is caused to be displayed on an email interface.

In a third embodiment, an email management engine is configured for accessing an email message. A categorization engine is configured for determining one or more email message categories for the email message. The one or more email message categories are any of the following: a scheduling meeting category, a requesting information category, or a task delegation category. The email management engine is further configured for, based on the one or more email message categories, executing a plurality of out-of-office (OOO) operations associated with the one or more email message categories. A first set of operations of the plurality of OOO operations are scheduling meeting operations, a second set of operations of the plurality of OOO operations are requesting information operations, and a third set of operations of the plurality of OOO operations are task delegation operations.

A context-aware dynamic response engine is configured for, based on executing one or more of the first set of operations, the second set of operations, or the third set of operations, generating one or more response for the email message. The one or more responses are associated with any of the following: scheduling meeting data, requesting information data, or task delegation data. The email management engine is further configured for, communicating the one or more responses to cause display of the response on an email interface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 1A-1B are block diagrams of an exemplary electronic mail system including an email management engine, in accordance with aspects of the technology described herein;

FIGS. 1C-1G are schematics associated with an exemplary electronic mail system including an email management engine, in accordance with aspects of the technology described herein;

FIG. 3 provides a first exemplary method of providing context-aware OOO assistance using an email management engine, in accordance with aspects of the technology described herein;

FIG. 4 provides a second exemplary method of providing context-aware OOO assistance using an email management engine, in accordance with aspects of the technology described herein;

FIG. 5 provides a third exemplary method of providing context-aware OOO assistance using an email management engine, in accordance with aspects of the technology described herein;

DETAILED DESCRIPTION OF THE TECHNICAL SOLUTION

Overview

Figure 1B:
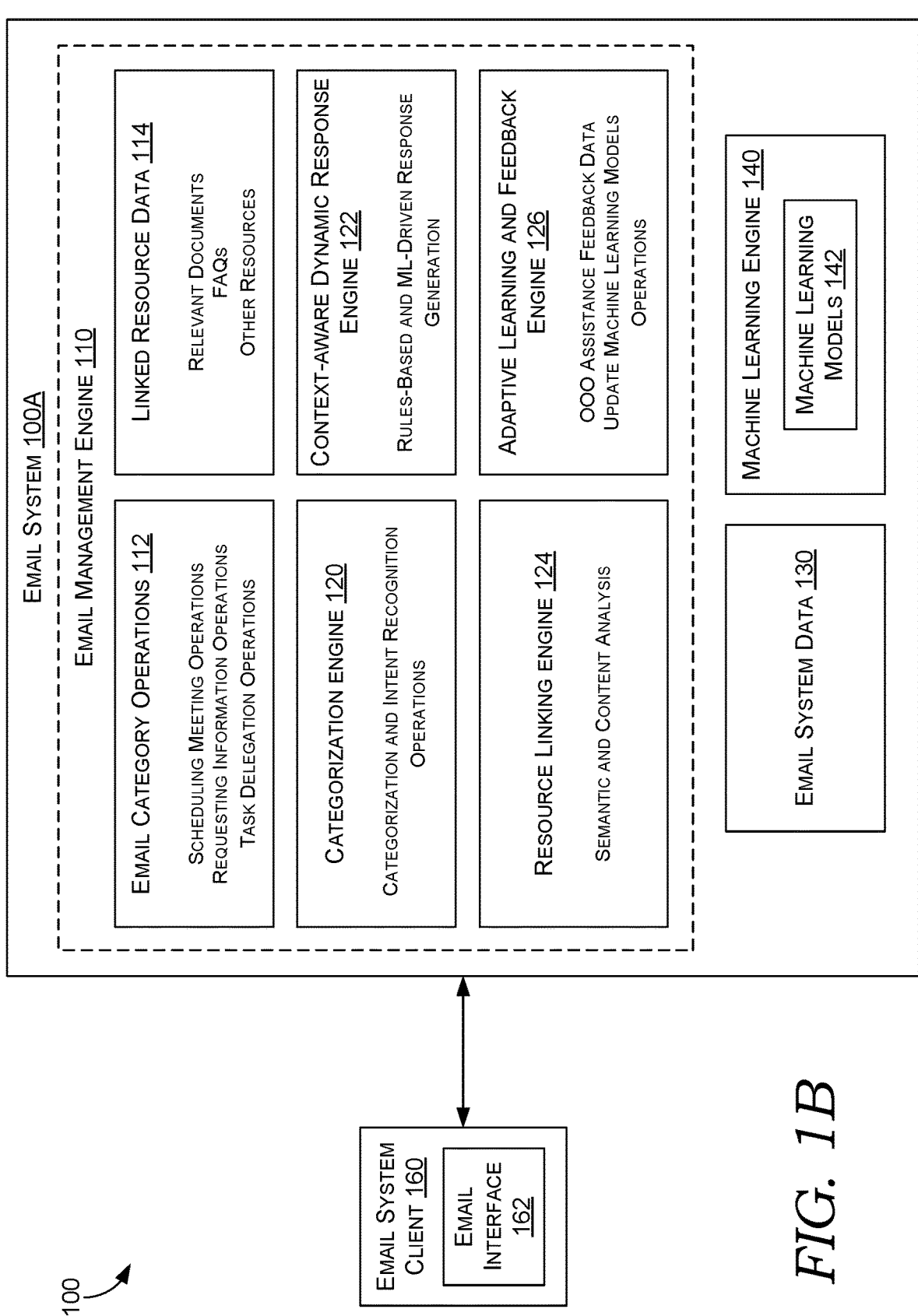

An electronic mail system enables the exchange of digital messages between users. For example, an electronic mail system can facilitate the communication of text-based messages, files, and other data over the internet. Emails have become a primary mode of communication for both personal and professional matters. An electronic mail system can include an out-of-office (OOO) feature or functionality that allows users to automatically respond to incoming emails when they are unavailable or out of the office. This feature is particularly useful for informing colleagues, clients, or other contacts about a person's absence and providing alternative contacts or information Conventionally, electronic mail systems are not configured with comprehensive computing logic and infrastructure to effectively manage emails for users who are unavailable or out of the office. Traditional OOO messages are often generic and lack context sensitivity. They provide a standard response to all incoming emails during a specified period, which may not meet the specific needs or urgency of different senders. In collaborative work environments, relying solely on conventional OOO responses can lead to delays and hinder teamwork. Alternative means may be necessary for team members to stay informed about each other's responsibilities. Furthermore, conventional OOO systems may not adequately support customization. While users can customize OOO messages to some extent, the level of customization is often limited. This lack of flexibility may prevent users from tailoring responses based on specific criteria or the nature of incoming emails. In essence, the limitations of conventional OOO systems highlight the need for more sophisticated and customizable solutions in email management. As such, a more comprehensive electronic mail system—with an alternative basis for performing email management operations—can improve computing operations and interfaces in electronic mail systems.

Embodiments of the present technical solution are directed to systems, methods, and computer storage media for, among other things, providing context-aware out-of-office (OOO) assistance using an email management engine (e.g., OOO assistant). Context-aware OOO assistance supports email management operations that provide out-of-office functionality with advanced artificial intelligence (AI) capabilities and context-awareness for efficient email management during periods of unavailability. In particular, the context aware OOO assistance includes actively assisting email senders with OOO guidance that includes information and resources that the email senders need. The context aware OOO assistance can provide out-of-office guidance for email messages associated with scheduling meetings, information requests, and task assignments.

The email management engine operates based on an email management workflow that includes a scheduling meeting workflow, an information request workflow, and a task assignment workflow. By way of illustration, when it comes to scheduling meetings, an OOO assistant provides real-time availability information and suggests alternative contacts-ensuring seamless meeting scheduling. For information requests, the OOO assistant can access and provide the requested data and make requested data readily available to a user. And, for tasks assignments, the OOO assistant offers the option to delegate tasks to the right users (e.g., colleagues)—ensuring tasks do not get stuck in the absence of the recipient. The email management workflow is associated with a computing framework that includes AI-driven categorization, context-aware dynamic responses, and resource links and document access.

At a high level, the email management engine can support providing context-aware out-of-office (OOO) assistance. With reference to FIG. 1C, FIG. 1C illustrates an example limitation of conventional OOO assistants. For example, traditional OOO messages are often generic and lack context sensitivity. They provide a standard response to all incoming emails during a specified period, which may not meet the specific needs or urgency of different senders. As shown, a sender user may need a quick project update, so the sender user sends an email message requesting the project update; however, the sender user may receive an OOO email message from an OOO receiver user, which causes a communication gap. The OOO email message lacks the capacity to assist the sender user and merely provides basic notifications that the OOO receiver user is away without any additional support or functionality. Sender email message 110C includes email body portion 112C that includes a request for information and further a request to schedule a meeting. However, the OOO email message 120C includes an email body portion 122C that simply provides return information and an alternative phone number. As such, context-aware OOO assistance can address the limitations of conventional OOO assistants.

With reference to FIG. 1D, context-aware OOO assistance (i.e., email management engine or system) can include generating context-aware response, personalized guidance, and resource linking using artificial intelligence (AI), Natural Language Processing (NLP) and machine learning techniques. The email management engine can support data collection and preprocessing; NLP for context understanding; categorization and intent recognition; rule-based and ML-driven response generation; resource linking; adaptive learning and user feedback loop; real-time availability and scheduling integration. The email management engine can leverage different technologies and resources to provide context-aware OOO assistance that understands context, provides personalized responses, and offers access to resources.

With continued reference to FIG. 1D, at step 1—block 110D—data collection and preprocessing operations are performed. The data collection and preprocessing operations begin with the collection of vast amounts of data, including historical emails, user preferences, and resource databases. This data is preprocessed to remove noise and irrelevant information. At step 2—block 120D—Natural Language Processing (NLP) and context understanding operations are performed. The NLP techniques are applied to the email content. These techniques include sentiment analysis, keyword extraction, and named entity recognition. Sentiment analysis helps gauge the tone of the email, ensuring empathetic responses. Keyword extraction identifies important terms in the email. Named entity recognition identifies people, organizations, and dates, providing context. At step 3—block 130D—categorization and intent recognition operations are performed. Machine learning models are used to categorize incoming emails into specific categories such as meeting requests, information inquiries, or task delegations. Intent recognition models identify the purpose of the email, such as scheduling data, requesting data, or task delegation data.

At step 4—block 140D—rules-based and ML-driven response generation operations are performed. Rule-based logic and machine learning techniques are employed to generate responses. Rules set by users are considered, ensuring personalized responses. Machine learning models assess the context and intent to generate suggestions or links to relevant resources. The system recommends responses based on historical successful interactions and user behavior. At step 5—block 150D—resource linking operations are performed. For resource linking, the system uses semantic search and content analysis. Semantic search helps identify the most relevant documents, FAQs, or resources from the database. Content analysis ensures that the linked resources are contextually appropriate.

At step 6—block 160D—adaptive learning and user feedback operations are performed. The system continuously learns from user interactions and feedback. Machine learning models are updated based on the success and user preferences. User feedback helps improve the quality and relevance of responses and linked resources. At step 7—block 170D—real-time availability and scheduling integration operations are performed. For scheduling, the system integrates with calendar and scheduling services. It utilizes AI to provide real-time availability information and offers scheduling options.

The technical solution can be further described by way of illustration and examples as discussed below. With reference to FIG. 1E, the "scheduling meeting" email category is associated with real-time availability and alternative contacts. With real-time availability, the OOO assistant provides real-time availability information for the OOO user. For example, when a colleague requests a meeting, it checks the OOO recipient user's schedule and provides available time slots. With alternative contacts, if the OOO recipient user is unavailable, the OOO assistant offers alternative contacts, such as a colleague who can assist with scheduling. This ensures that meeting requests are promptly addressed, preventing delays. In this way, when an incoming email is categorized with the "scheduling a meeting" email category when the recipient user is OOO, the OOO assistant assigns pre-defined rules. For example, a rule for this category might instruct the assistant to provide a link to a real-time meeting scheduler and indicate the user's unavailability.

A "scheduling meeting" workflow can include accessing an email requesting a meeting, then, at step 1—block 110E—the OOO assistant first analyzes the email content, looking for keywords related to scheduling, urgency, and specific time preferences. At step 2—block 120E—the OOO assistant identifies the context by recognizing that a meeting request is being made and determines the urgency based on keywords or phrases used in the email. At step 3—block 130E—the OOO assistant checks the OOO recipient user's real-time availability through calendar integration. It identifies open time slots when the OOO recipient user is available and understands any time constraints mentioned in the email. At step 4—block 140E—using the context and availability information, the OOO assistant generates a response. It may propose available meeting times, suggest alternative contacts if the OOO recipient user is unavailable, and include a polite message to facilitate the scheduling process.

With continued reference to FIG. 1E, a sender user may communicate an email message requesting to schedule a meeting. An example email response message 150E in accordance with the present technical solution is illustrated—with the email response message including email body portion 152E including email response data that provide a quick resolution by suggesting different free slots 152E_1; a calendar link 152E_2 to schedule meetings and an alternative contact 152E_3 for the sender user.

Figure 1E:
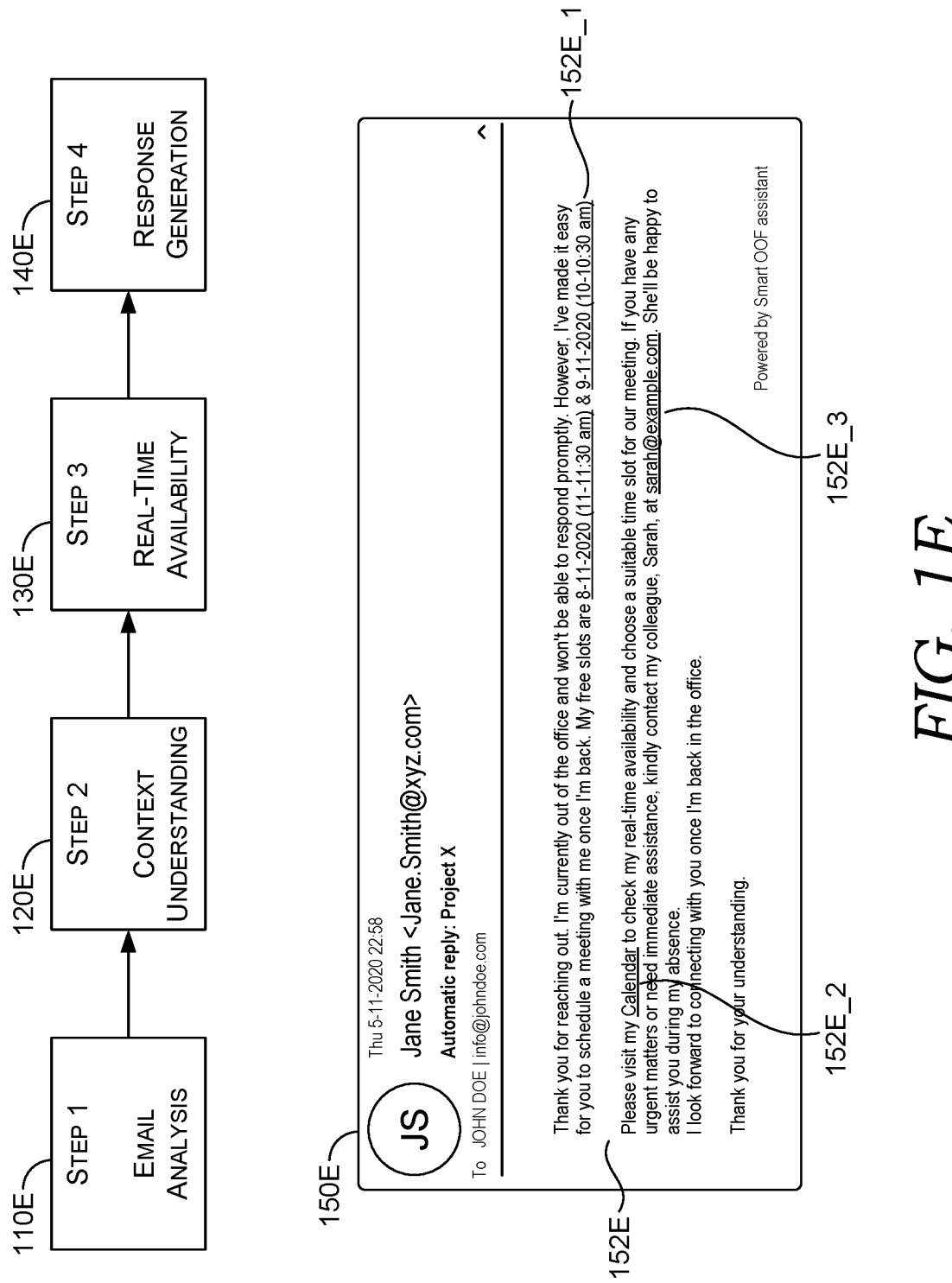
Figure 1F:
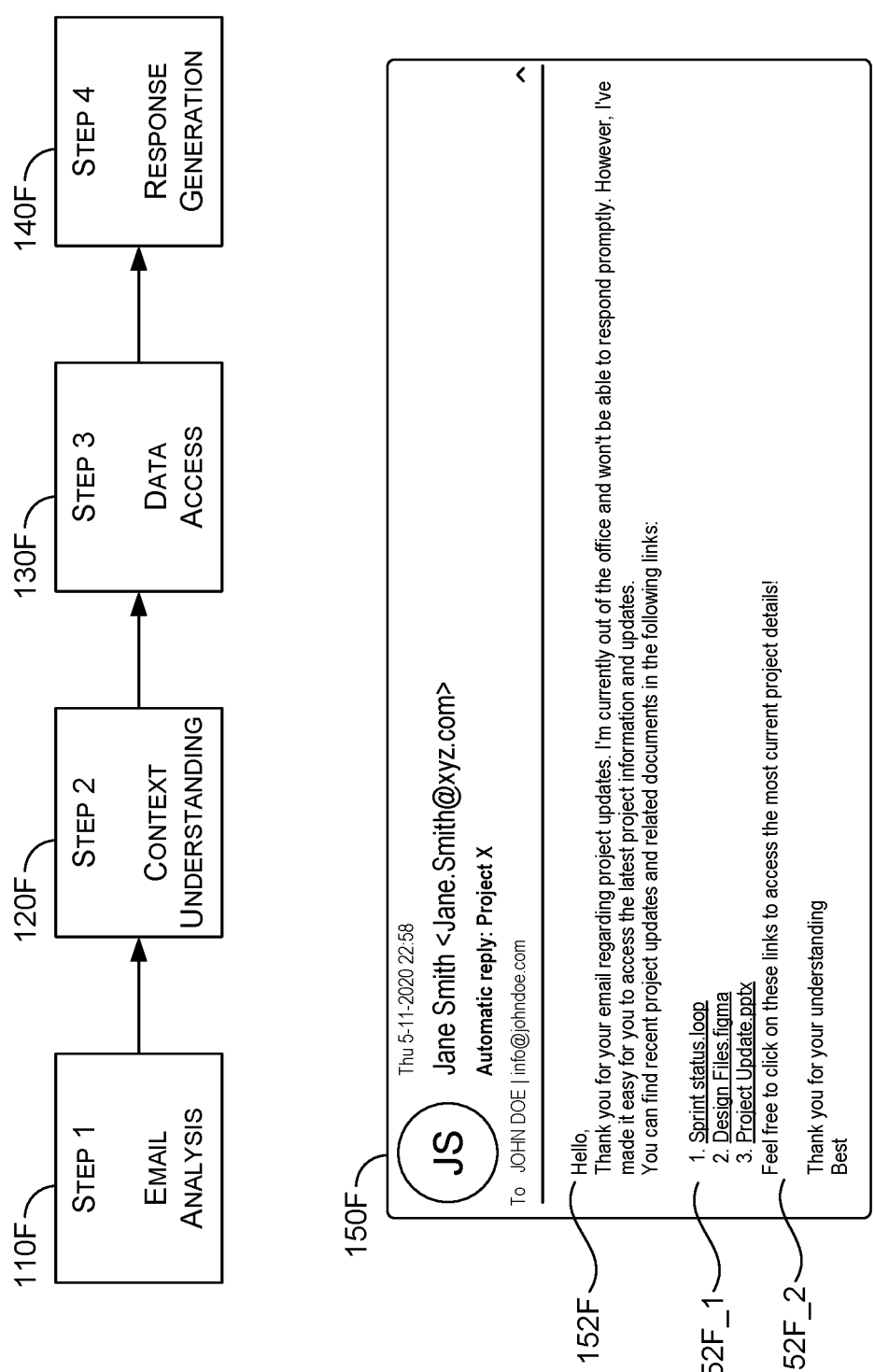

With reference to FIG. 1F, the "requesting information" email category is associated with information retrieval and automated responses. With information retrieval, the OOO assistant has access to important project updates and work data (e.g., financial data, medical data, code data) and it can provide this information to external clients or colleagues making information requests. It maintains a database of frequently requested information. With automated response, when an information request is received, the OOO assistant can provide the required information immediately, reducing delays and ensuring that clients or colleagues receive the data they need. In this way, when the incoming email is categorized as "requesting information" email category when the recipient user is OOO, the OOO assistant assigns pre-defined rules. For example, for these emails, the rule may guide the assistant to offer links to relevant resources or FAQs, along with information about the user's return date.

A "requesting information" workflow can include accessing an email requesting information, then at step 1—block 110F—the OOO assistant analyzes the email content for keywords related to the requested information, project names, or data types. At step 2—block 120F—the OOO assistant identifies the context as an information request and recognizes the specific data or content being sought. At step—block 130F—the OOO assistant accesses the database of frequently requested information or connects to relevant data sources to retrieve the required information. At step 4—block 140F—generates an automated response containing the requested information. The response includes the data and contextual explanations to address the requester's needs.

With continued reference to FIG. 1F, a sender user may communicate an email message requesting information. An example email response message 150F in accordance with the present technical solution illustrated—with the email response message including email body portion 152F including email response data that provide a quick resolution by sharing project links 152F_1 and additional guidance 152F_2 for how to access requested information.

Figure 1G:
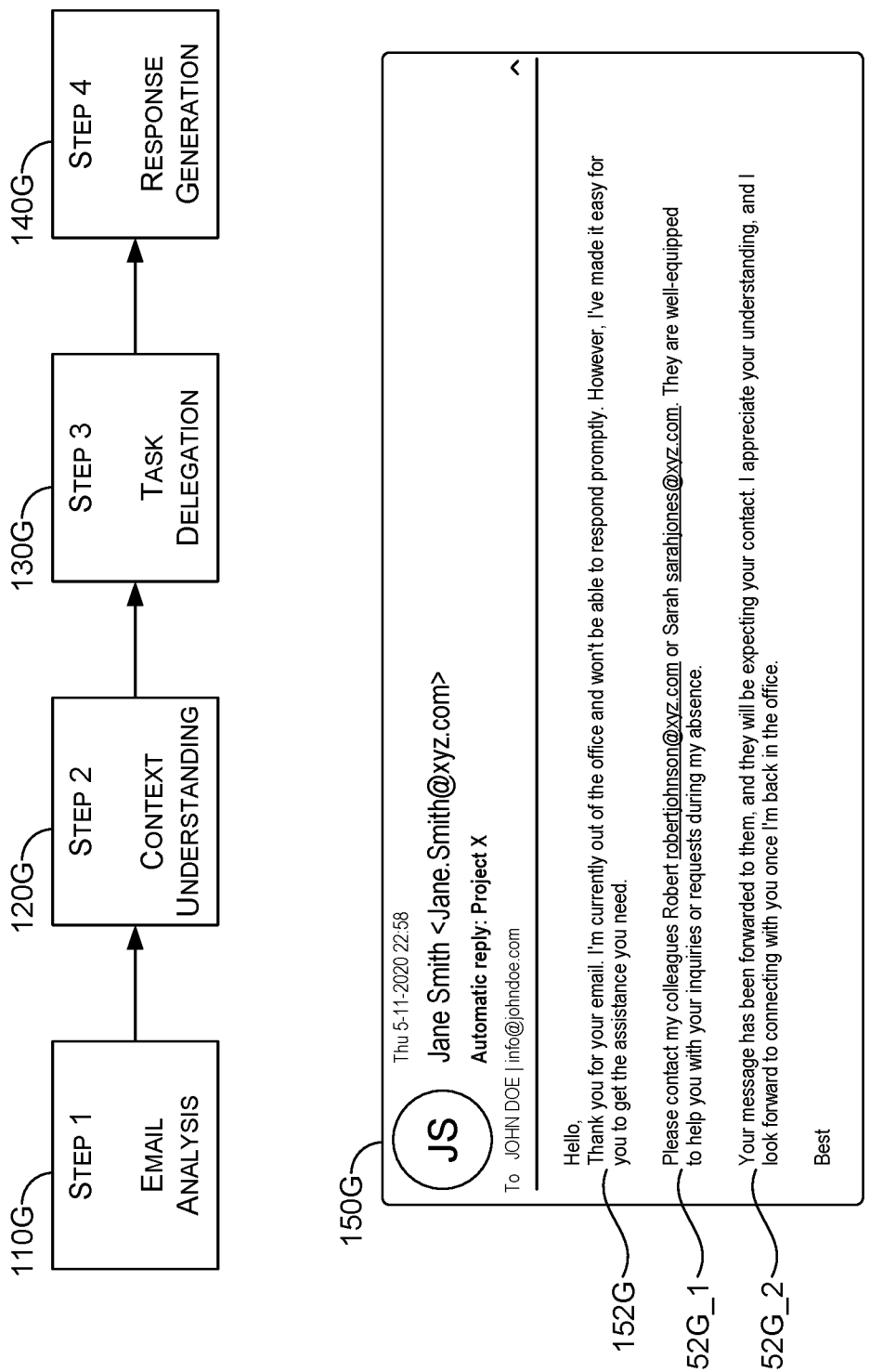

With reference to FIG. 1G, the "task delegation" email category is associated with situations where an OOO recipient user receives a task request during their absence, the OOO assistant offers the option to delegate the task to another team member. It identifies the most suitable colleague based on skills and availability. The task delegation email category is associated with follow-up alerts. With follow-up alerts, if the OOO recipient user chooses to defer the task, the assistant sets up follow-up alerts to ensure the task is completed promptly upon the OOO recipient user's return, preventing bottlenecks. In this way, when an incoming email is categorized with the "task delegation" email category when the recipient user is OOO, the OOO assistant assigns pre-defined rules. For example, the rule could suggest forwarding the email to an alternate contact and notifying the sender about the delegation.

A "task delegation" workflow can include accessing an email that requests the OOO recipient user to take action, at step 1—block 110G—the OOO assistant analyzes the email content to understand the nature of the task, its urgency, and the action required. At step 2—block 120G—it identifies that a task is being assigned to the OOO recipient user and recognizes any deadlines or specific instructions provided in the email. At step 2—block 120G—the OOO assistant offers the OOO recipient user the option to delegate the task to a suitable colleague. It identifies potential task recipients based on skills and availability. If the OOO recipient user chooses to defer the task, the OOO assistant sets up follow-up alerts to ensure the task is completed upon the OOO recipient user's return.

With continued reference to FIG. 1G, a sender user may communicate an email message requesting to a task to be performed. An example email response message 150G in accordance with the present technical solution is illustrated with the email response message including email body portion 152G including email response data that provide a quick resolution by identifying an alternate contact 152G_1 to perform the task, and additional guidance 152G_2 describing how the task is being delegated.

Advantageously, the email management system provides integration of advanced AI capabilities and context-awareness to transform the OOO email messages into a dynamic and responsive communication tool during periods of unavailability. The technical solution supports context-aware responses, personalized guidance, and resource linking, amongst other features and functionality. With context-aware responses, the technical solution has the ability to recognize the context, intent, and urgency of incoming emails and generate dynamic, context-aware responses is a significant innovation. This goes beyond the traditional OOO message, which offers only basic notifications of unavailability. With personal guidance, the system provides personalized guidance to email senders, directing them to relevant information, resources, or alternative contacts. This level of personalization addresses limitations in conventional OOO assistants and enhances the email experience. With resource linking, the technical solution provides the capability to access and provide links to specific documents, webpages, or shared resources is innovative. It ensures that senders can access the information they need, even when the recipient is unavailable. In this way, the technical solution is rooted in dynamic and user-centric approach to email management, leveraging AI and context-awareness to provide more efficient and effective communication during periods of unavailability. This innovation enhances the email experience for both senders and recipients.

Aspects of the technical solution can be described by way of examples and with reference to FIGS. 1A-1B. FIG. 1A illustrates a cloud computing environment (system) 100 and electronic mail system 100A. The electronic mail system 100A includes network 110B, email management engine 110, email system data 130, and machine learning engine 140D.

The cloud computing environment 100 provides computing system resources for different types of managed computing environments. For example, the cloud computing platform supports delivery of computing services—including compute, servers, storage, databases, networking, and intelligence. A plurality of email system clients (e.g., email system client 160) include hardware or software that access resources in the cloud computing environment 100. Email system client 160 can include an application or service (e.g., email client and email interface) that supports client-side functionality associated with cloud computing environment 100. For example, email system client 160 may support providing OOO assistance in accordance with embodiments of the present technical solution. The plurality of email system clients and email management system 100A components of the cloud computing environment 100 can communicate via a network (e.g., network 100B) to perform computing operations.

The electronic mail system 100A is designed to provide context-aware OOO assistance using the email management engine 110. The electronic mail system 100A supports email management operations that provide OOO functionality with advanced artificial intelligence (AI) capabilities and context-awareness for email management during periods of unavailability. In particular, the context-aware OOO assistance includes actively assisting email senders with OOO guidance that includes information and resources that the email senders need. The context-aware OOO assistance can provide OOO guidance for email messages associated with scheduling meetings, information requests, and task assignments.

The email management engine 110 supports generating context-aware responses, personalized guidance, and resource linking using artificial intelligence (AI), Natural Language Processing (NLP) and machine learning techniques. The email management engine 110 can support data collection and preprocessing; NLP for context understanding; categorization and intent recognition; rule-based and ML-driven response generation; resource linking; adaptive learning and user feedback loop; real-time availability and scheduling integration. The email management engine 110 can leverage different technologies and resources to provide context-aware OOO assistance that understands context, provides personalized responses, and offers access to resources.

The email system data 130 can refer to the information and data associated with an email system 100A. The email system data 130 can include various elements related to functioning of the email system 100A and the messages it handles. The email system data 130 can include historical emails, user preferences, and resource databases that can be processed for generating machine learning models and providing different types of context-aware responses. The email system data 130 can be associated with generating machine learning models associated with providing the functionality described herein. The email system data 130 can further refer to data associated with providing context-aware OOO guidance and adaptive learning and user feedback, as discussed herein in more detail.

Machine learning engine 140 is a machine learning framework or library that operates as a tool for providing infrastructure, algorithms, capabilities for designing, training, and deploying machine learning models. The machine learning engine 140 can include pre-built functions and APIs that enable building and applying machine learning techniques. The machine learning engine 140 can provide a machine learning workflow from data processing and feature extraction to model training, evaluation, and deployment.

The machine learning engine 140 can include different types of machine learning models. The machine learning engine 140 incorporates various models tailored for distinct tasks, such as Linear Regression for predicting continuous outcomes, Logistic Regression for binary classification, Decision Trees and Random Forest for classification and regression using tree-like structures, Support Vector Machines for effective high-dimensional classification, K-Nearest Neighbors for classifying data points based on their neighbors, Neural Networks for complex tasks like image recognition, Naive Bayes for text classification, Clustering Algorithms like K-Means for grouping similar data points, PCA for dimensionality reduction, Recurrent Neural Networks and Long Short-Term Memory Networks for sequential data, Gradient Boosting for building strong predictive models, and Autoencoders for efficient data representation. Whether through traditional statistical methods or deep learning architectures, these models collectively empower the machine learning engine 140 to tackle diverse challenges in classification, regression, clustering, and feature extraction. The machine learning engine 140 can support generating machine learning models associated with the functionality described herein based on email system data 130.

With reference to FIG. 1B, FIG. 1B illustrates electronic mail system 100A, email management engine 110 including email management operations 12, linked resource database data 114, categorization engine 120, context-aware dynamic response engine 122, resource linking engine 124, adaptive learning and feedback engine 126, email system data 130, machine learning engine 140 having machine learning models 142; and email system client 160 having email interface 162.

Email management engine 110 is responsible for providing an email management workflow that includes a scheduling meeting workflow, an information request workflow, and a task assignment workflow. The email management workflow is associated with a computing framework that includes AI-driven categorization, context-aware dynamic responses, and resource links and document access. The email management engine 110 can provide data collection and preprocessing operations, natural language processing and context understanding operations. The email management engine 110 can provide rules-based and ML-driven response generation operations. Rule-based logic and machine learning techniques can be employed to generate responses, as discussed further herein.

Email management engine 110 can further support resource linking operations, where semantic search helps identify the most relevant documents, FAQs, or resources. Email management can support real-time availability and scheduling integration operations. For scheduling, the email management engine 110 integrates with calendar and scheduling service and utilizes AI to provide real-time availability information and offers scheduling options.

The categorization engine 120 is responsible for categorization and intent recognition. Intent recognition models identify the purpose of an email including scheduling data, requesting data, and task delegation data. The scheduling data, requesting data, and task delegation data can be used to generate responses that include each of the scheduling data, requesting data, and task delegation data. The context-aware dynamic response engine 122 is responsible for rules-based and ML-driven response generation operations. Rule-based logic and machine learning techniques are employed to generate responses. Rules set by users are considered, ensuring personalized responses. Machine learning models assess the context and intent to generate suggestions or links to relevant resources. The context-aware dynamic response engine 122 recommends responses based on historical successful interactions and user behavior.

The resource linking engine 124 is responsible for performing resource linking operations. For resource linking, the resource linking engine 124 uses semantic search and content analysis. Semantic search helps identify the most relevant documents, FAQs, or resources from the database.

Content analysis ensures that the linked resources are contextually appropriate. The adaptive learning and feedback engine 126 is responsible for continuously learning from user interactions and feedback. Machine learning models are updated based on the success and user preferences. User feedback helps improve the quality and relevance of responses and linked resources.

The email system client 160 and the email interface 162 are responsible for causing display of different types of response email associated with embodiments of the present technical solution. The email interface 162 can cause display of an email response that is generated based on a scheduling meeting email category, requesting information email category, or a task delegation email category. The response email for the scheduling meeting email category can include email response data that provide a quick resolution by suggesting different free slots; a calendar link to schedule meetings and an alternative contact for the sender user. The response email for the requesting information email category can include email response data that provide a quick resolution by sharing project links and additional guidance for how to access requested information. The response email for the task delegation category can include email response data that provide a quick resolution by identifying an alternate contact to perform the task, and additional guidance describing how the task is being delegated.

Figure 2A:
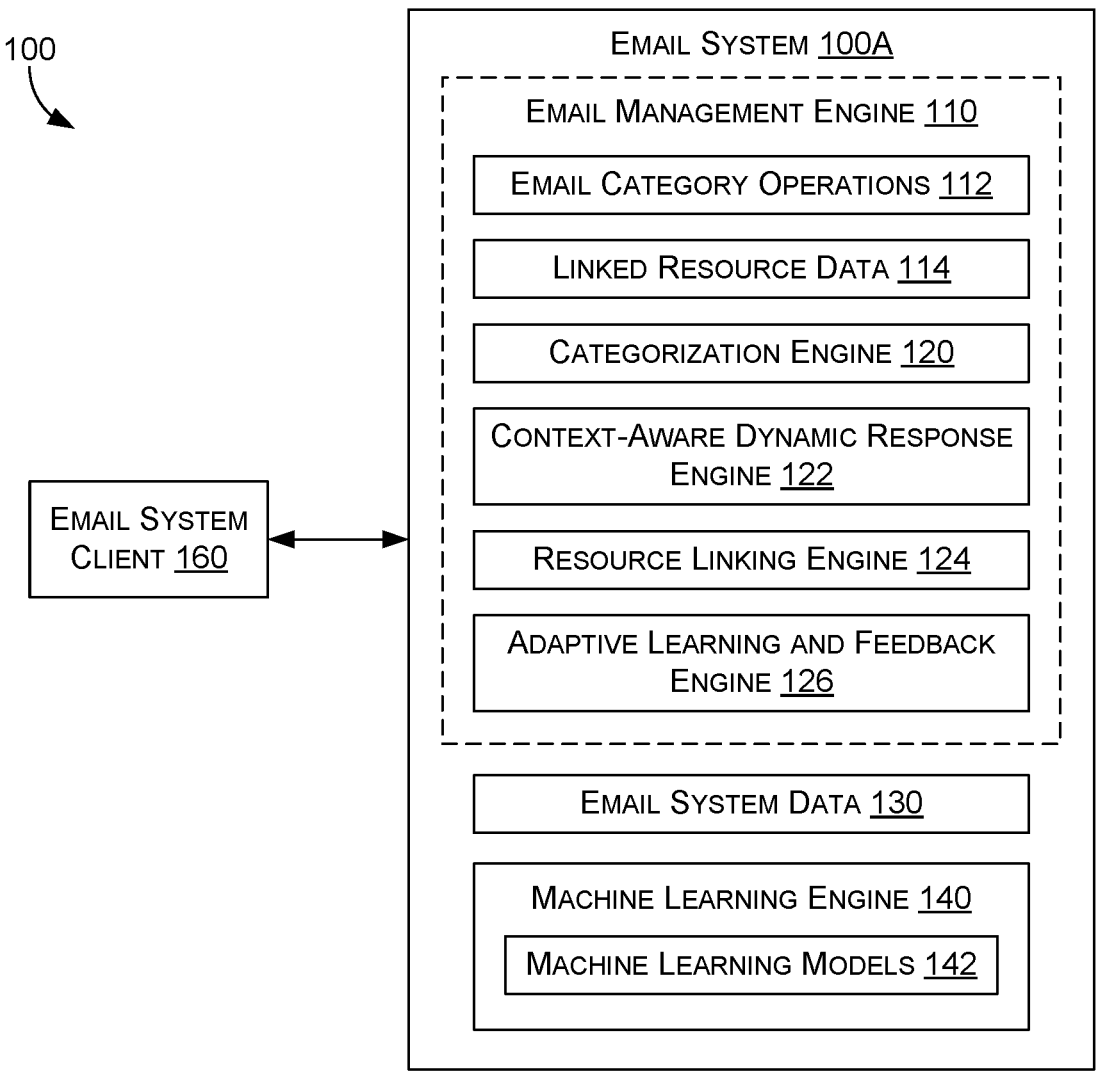
FIGS. 2A and 2B are block diagrams of an exemplary electronic mail system including an email management engine, in accordance with aspects of the technology described herein.
Figure 2B:
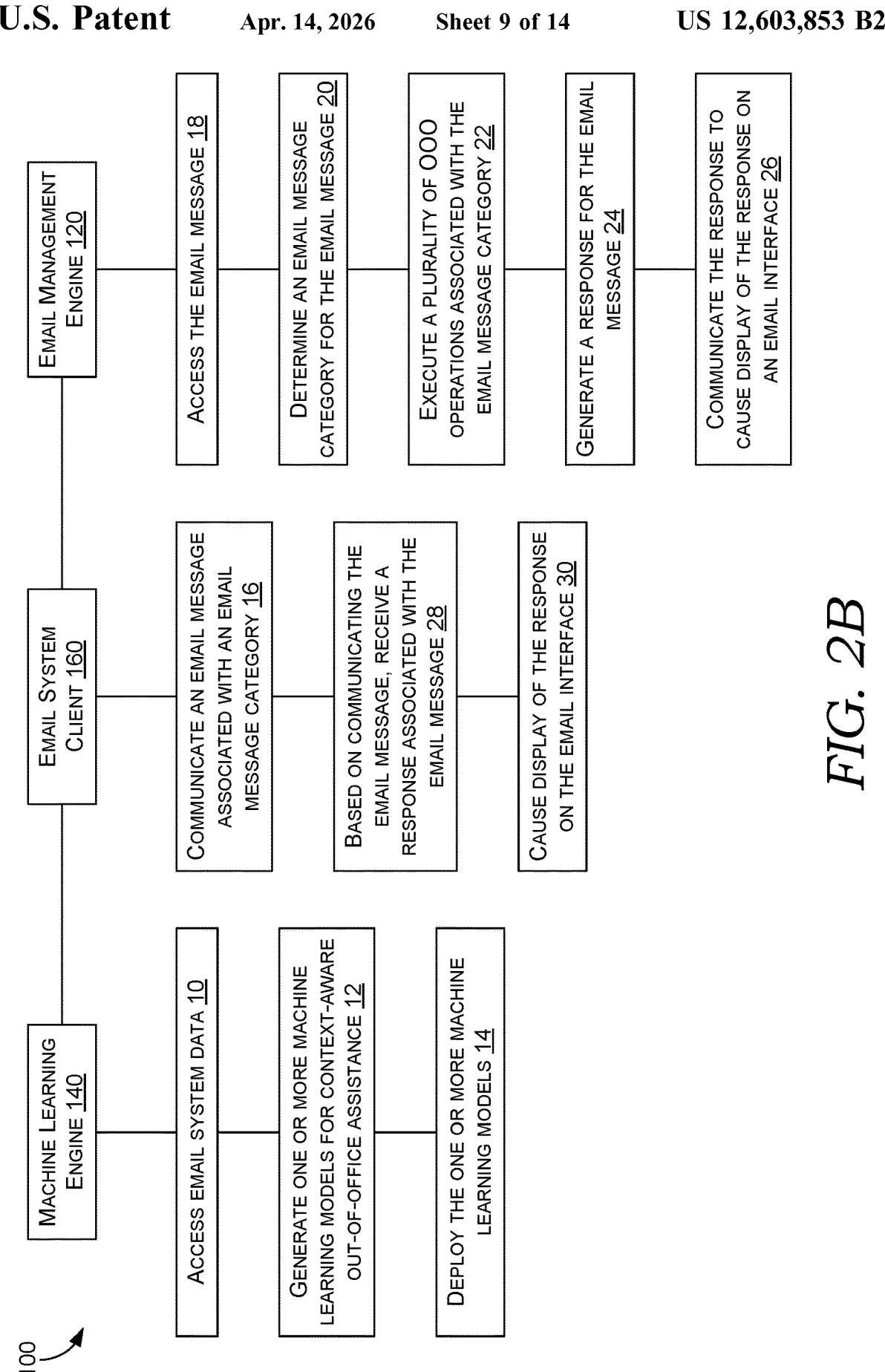

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example email system 100 in which methods of the present disclosure may be employed. In particular, FIG. 2A shows a high level architecture of the email system 100A in accordance with implementations of the present disclosure. Among other engines, managers, generators, selectors, or components not shown (collectively referred to herein as "components"), the technical solution environment of email system 100 corresponds to FIGS. 1A and 1B.

With reference to FIG. 2A, FIG. 2A illustrates a cloud computing environment (system) 100 and electronic mail system 100A. The electronic mail system 100A includes email management engine 110 having email category operations 112, linked resource data 114, categorization engine 120 and context-aware dynamic response engine 122; resource linking engine 124; and adaptive learning and feedback engine 126; email system data 130, machine learning engine 140 having machine learning model 142; and email system client 160.

The email management engine 110 is configured for accessing an email message. The email management engine 110 operates based on an email management workflow that includes each of the following: a scheduling workflow, an information request workflow, and a task assignment workflow. The scheduling meeting workflow provides real-time availability information and suggests alternative contacts; the information request workflow provides requested data and makes requested data available to users associated with the email management engine; and the task assignment workflow supports delegating tasks to users associated with the email management engine. The email management engine 110 supports performing Natural Language Processing (NLP) and context understanding operations on email messages associated with the email management engine.

The categorization engine 120 is configured for determining one or more email message categories for the email message. The one or more email message categories are any of the following: a scheduling meeting category, a requesting information category, or a task delegation category. The categorization engine 120 employs a machine learning model to support executing intention recognition operations to identify email message categories for email messages associated with the email management engine 110.

Based on the one or more email message categories, the email management engine 110 executes a plurality of out-of-office (OOO) operations associated with the one or more email message categories. A first set of operations of the plurality of OOO operations are scheduling meeting operations; a second set of operations of the plurality of OOO operations are requesting information operations; and a third set of operations of the plurality of OOO operations are task delegation operations. The plurality of OOO operations include: the scheduling meeting operations comprising determining real-time availability information for an OOO user; and identifying alternative contacts for the OOO user; the requesting information operations comprising providing requested information associated with an email message; and storing and linking relevant resources to email messages; the task delegation operations comprising identifying tasks and identifying potential delegates for performing the task; and generating a follow-up alert for an OOO recipient user who has elected to defer performing tasks while OOO.

The context-aware dynamic response engine 122 is configured for, based on executing one or more of the first set of operations, the second set of operations, or the third set of operations, generating one or more responses for the email message. The one or more responses are associated with any of the following: scheduling meeting data, requesting information data, or task delegation data. The scheduling meeting data comprises a suggestion of availability slots and a calendar link to schedule a meeting, the requesting information data comprises links to requested resources, and the task delegation data comprises an alternative contact associated with performing a task identified in an email message. The context-aware dynamic response engine 122 generates a first response for the scheduling meeting category, a second response for the requesting information category, or a third response for the task delegation category.

The email management engine 110 is configured for, communicating the one or more responses to cause display of the response on an email interface. The email client 160 is configured for communicating an email message; based on communicating the email message, receiving a response associated with the email message; and causing display of the response on an email interface.

The adaptive learning and user feedback engine 126 updates one or more machine learning models based on context-aware OOO assistance feedback data. One or more subsequent responses are generated based on the one or more updated machine learning models.

With reference to FIG. 2B, FIG. 2B illustrates a cloud computing infrastructure 100 having email management engine 120, machine learning engine 140, and email system client 160 in accordance with embodiments of the present technical solution. At block 10, the machine learning engine accesses email system data; at block 12 generates one or more machine learning models for context-aware out-of-office assistance; and at block 14, deploys the one or more machine learning models. At block 16, the email system client communicates an email message associated with an email message category.

At block 18, the email management engine 120 accesses the email message; at block 20, determines an email message category for the email message; at block 22, executes a plurality of OOO operations associated with the email message category; at block 24, generates a response for the email message; and at block 26, communicates the response to cause display of the response on an email interface. At block 28, the email system client receives a response associated with the email message; and at block 30, causes display of the response on the email interface.

Example Methods

With reference to FIGS. 3, 4, and 5, flow diagrams are provided illustrating methods for providing context-aware out-of-office assistance using an email management engine. The methods may be performed using the electronic mail system described herein. In embodiments, one or more computer-storage media having computer-executable or computer-useable instructions embodied thereon that, when executed, by one or more processors can cause the one or more processors to perform the methods (e.g., computer-implemented method) in the electronic mail system (e.g., a computerized system or computing system).

Turning to FIG. 3, a flow diagram is provided that illustrates a method 300 for providing context-aware out-of-office assistance using an email management engine in an electronic mail system. At block 302, access an email message. At block 304, determine one or more email message categories for the email message, where the one or more email message categories are any of the following: a scheduling meeting category, a requesting information category, or a task delegation category. At block 306, based on the one or more email message categories, execute a plurality of out-of-office (OOO) operations associated with the one or more email message categories, where a first set of operations of the plurality of OOO operations are scheduling meeting operations, a second set of operations of the plurality of OOO operations are requesting information operations, and a third set of operations of the plurality of OOO operations are task delegation operations. At block 308, based on executing one or more of the first set of operations, the second set of operations, or the third set of operations, generate one or more responses for the email message, where the one or more responses are associated with any of the following: scheduling meeting data, requesting information data, or task delegation data. At block 310, communicate the one or more responses to cause display of the response on an email interface.

Turning to FIG. 4, a flow diagram is provided that illustrates a method 400 for providing context-aware out-of-office assistance using an email management engine in an electronic mail system. At block 402, communicate an email message associated with an email message category, where the email message category is one of the following: a scheduling meeting category, a requesting information category, or a task delegation category. At block 404, based on communicating the email message, receive a response associated with the email message, where the response is generated based on executing a plurality of out-of-office (OOO) operations associated with the email message category, the response is associated with one of the following: scheduling meeting data, requesting information data, or task delegation data. At block 406, cause display of the response on an email interface.

Turning to FIG. 5, a flow diagram is provided that illustrates a method 500 for providing context-aware outof-office assistance using an email management engine in an electronic mail system. At block 502, access an email message. At block 504, determine an email message category for the email message, where the email message category is one of the following: a scheduling meeting category, a requesting information category, or a task delegation category. At block 506, based on the email message category, execute a plurality of out-of-office (OOO) operations associated with the email message category. At block 508, based on executing the plurality of OOO operations associated with the email message category, generate a response for the email message, where the response is associated with one of the following: scheduling meeting data, requesting information data, or task delegation data. At block 510, communicate the response to cause display of the response on an email interface.

Technical Improvement

Advantageously, the embodiments of the present technical solution include several inventive features (e.g., operations, systems, engines, and components) associated with an electronic mail system having the email management engine. Inventive features will be described with reference to operations providing context-aware out-of-office (OOO) assistance using an email management engine. Functionality of the embodiments of the present technical solution have been described, by way of an implementation and anecdotal examples, to demonstrate that the email management operations are a solution to a specific problem in email management to improve computing operations and interfaces for electronic mail systems. For example, the email management system provides integration of advanced AI capabilities and context-awareness to transform the OOO email messages into a dynamic and responsive communication tool during periods of unavailability.

The technical solution supports context-aware responses, personalized guidance, and resource linking, amongst other features and functionality. With context-aware responses, the technical solution has the ability to recognize the context, intent, and urgency of incoming emails and generate dynamic, context-aware responses is a significant innovation. This goes beyond the traditional OOO message, which offers only basic notifications of unavailability. With personal guidance, the system provides personalized guidance to email senders, directing them to relevant information, resources, or alternative contacts. This level of personalization addresses limitations in conventional OOO assistants and enhances the email experience. With resource linking, the technical solution provides the capability to access and provide links to specific documents, webpages, or shared resources is innovative. It ensures that senders can access the information they need, even when the recipient is unavailable. In this way, the technical solution is rooted in dynamic and user-centric approach to email management, leveraging AI and context-awareness to provide more efficient and effective communication during periods of unavailability. This innovation enhances the email experience for both senders and recipients.

Additional Support for Detailed Description

Example Distributed Computing System Environment

Figure 6:
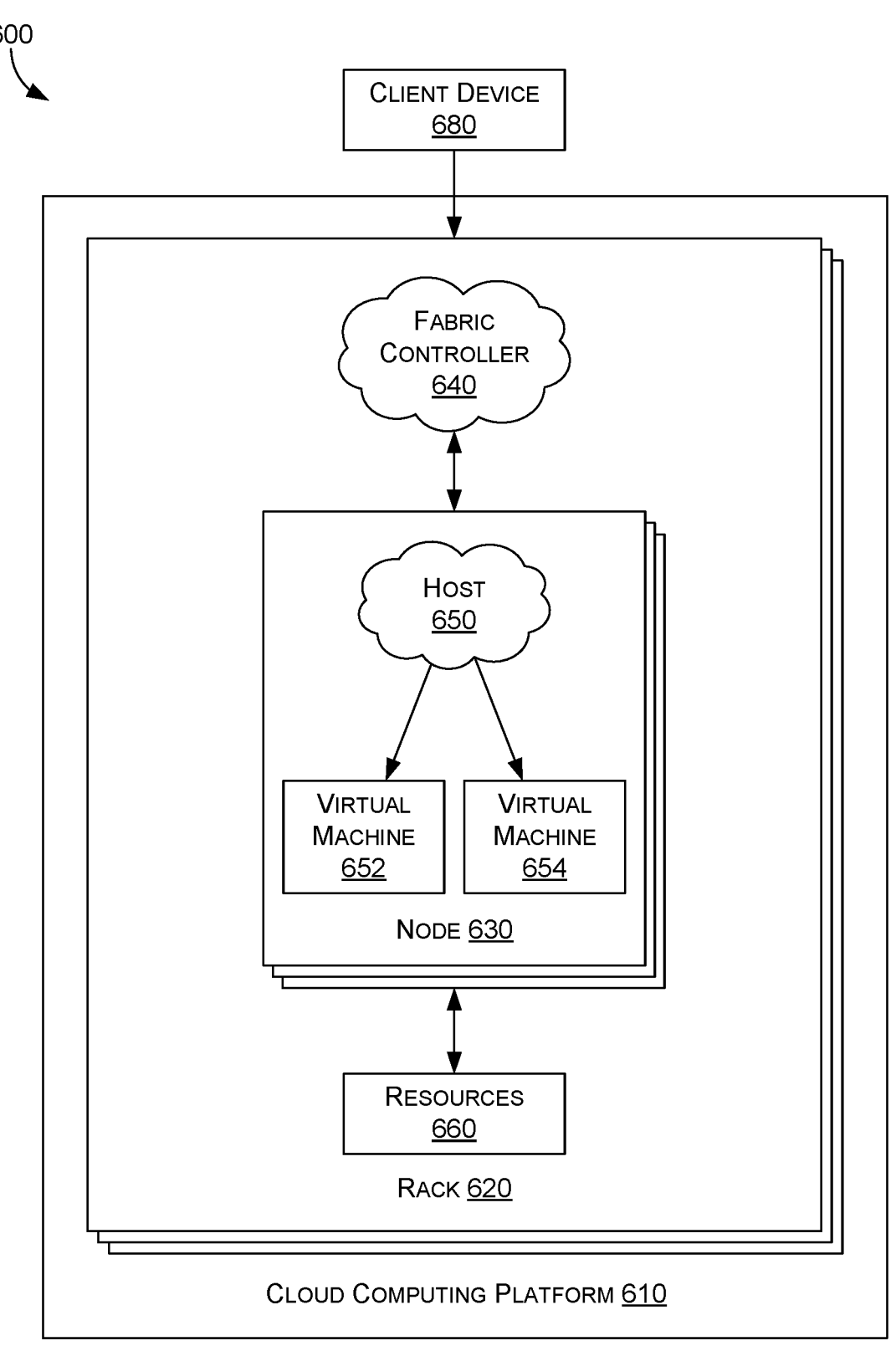
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant may be a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present technical solution, an example operating environment in which embodiments of the present technical solution may be implemented is described below in order to provide a general context for various aspects of the present technical solution. Referring initially to FIG. 6 in particular, an example operating environment for implementing embodiments of the present technical solution is shown and designated generally as computing device 600. Computing device 600 is but one example of a suitable computing environment and is not intended to suggest any limitation as to the scope of use or functionality of the technical solution. Neither should computing device 700 be interpreted as having any dependency or requirement relating to any one or combination of components illustrated.

The technical solution may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technical solution may be practiced in a variety of system configurations, including hand-held devices, consumer electronics, general-purpose computers, more specialty computing devices, etc. The technical solution may also be practiced in distributed computing environments where tasks are performed by remote-processing devices that are linked through a communications network.

Figure 7:
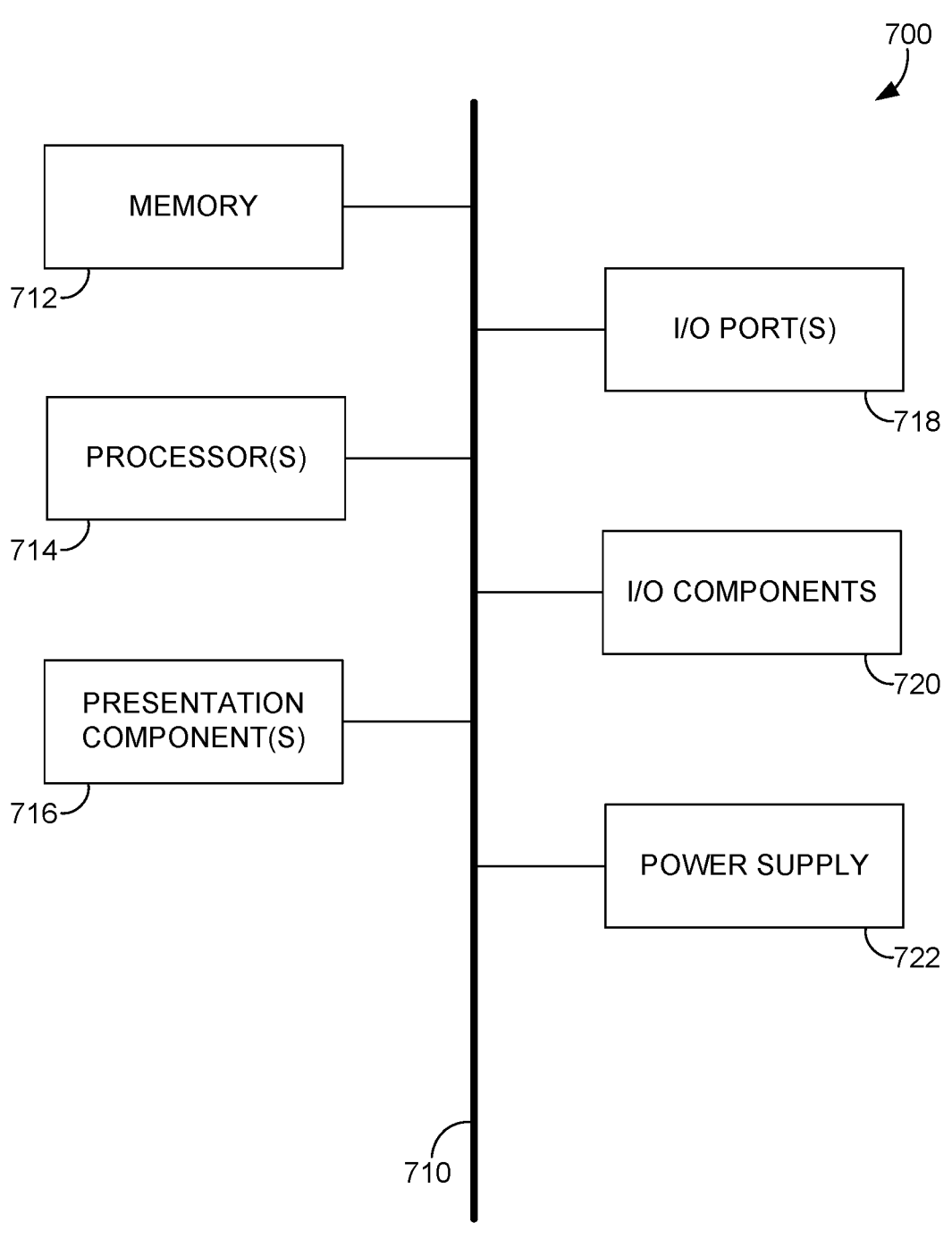
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present technical solution. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the technical solution is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technical solution are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present technical solution may generally refer to the technical solution environment and the schematics described herein, it is understood that the techniques described may be extended to other implementation contexts.

Embodiments of the present technical solution have been described in relation to particular embodiments which are intended in all respects to be illustrative rather than restrictive. Alternative embodiments will become apparent to those of ordinary skill in the art to which the present technical solution pertains without departing from its scope.

From the foregoing, it will be seen that this technical solution is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations, the operations comprising:

an email management engine configured for:

accessing an email message;

an categorization engine configured for determining one or more email message categories for the email message, wherein the one or more email message categories are any of: a scheduling meeting category, a requesting information category, or a task delegation category;

the email management engine configured for, based on the one or more email message categories, executing a plurality of out-of-office (OOO) operations associated with the one or more email message categories, wherein a first set of operations of the plurality of OOO operations are scheduling meeting operations, wherein a second set of operations of the plurality of OOO operations are requesting information operations, and wherein a third set of operations of the plurality of OOO operations are task delegation operations, wherein the email management engine supports a plurality of categorized email management workflows, wherein a categorized email management workflow comprises a structured, category-specific set of 000 operations that are executed based on a selected email message and a corresponding determined category of the selected email message;

a context-aware dynamic response engine configured for, based on executing one or more of the first set of operations, the second set of operations, or the third set of operations, generating one or more responses for the email message, wherein the one or more responses are associated with any of: scheduling meeting data, requesting information data, or task delegation data; and the email management engine configured for, communicating the one or more responses to cause display of the response on an email interface.

2. The system of claim 1, wherein the email management engine operates based on an email management workflow that includes each of: a scheduling workflow, an information request workflow, and a task assignment workflow.

3. The system of claim 2, wherein the scheduling meeting workflow provides real-time availability information and suggests alternative contacts, the information request workflow provides requested data and makes requested data available to users associated with the email management engine, and the task assignment workflow supports delegating tasks to users associated with the email management engine.

4. The system of claim 1, wherein the email management engine supports performing Natural Language Processing (NLP) and context understanding operations on email messages associated with the email management engine.

5. The system of claim 1, wherein the categorization engine employs a machine learning model to support executing intention recognition operations to identify email message categories for email messages associated with the email management engine.

6. The system of claim 1, the plurality of OOO operations include:

the scheduling meeting operations comprising determining real-time availability information for an OOO user; and identifying alternative contacts for the OOO user;

the requesting information operations comprising providing requested information associated with an email message; and storing and linking relevant resources to email messages; and the task delegation operations comprising identifying tasks and identifying potential delegates for performing the task; and generating a follow-up alert for an OOO recipient user who has elected to defer performing tasks while OOO.

7. The system of claim 1, wherein the scheduling meeting data comprises a suggestion of availability slots and a calendar link to schedule a meeting, the requesting information data comprises links to requested resources, and the task delegation data comprises an alternative contact associated with performing a task identified in an email message.

8. The system of claim 1, wherein the context-aware dynamic response engine generates a first response for the scheduling meeting category, a second response for the requesting information category, or a third response for the task delegation category.

9. The system of claim 1, further comprising an adaptive learning and user feedback engine that updates one or more machine learning models based on context-aware OOO assistance feedback data, wherein one or more subsequent responses are generated based on the one or more updated machine learning models.

10. The system of claim 1, further comprising an email client configured for:

communicating the email message;

based on communicating the email message, receiving a response associated with the email message; and causing display of the response on an email interface.

11. One or more computer-storage media having computer-executable instructions embodied thereon that, when executed by a computing system having a processor and memory, cause the processor to perform operations, the operations comprising:

communicating, to an email management engine, an email message associated with an email message category, wherein the email message category is one of: a scheduling meeting category, a requesting information category, or a task delegation category, wherein the email management engine supports a plurality of categorized email management workflows, wherein a categorized email management workflow comprises a structured, category-specific set of OOO operations that are executed based on a selected email message and a corresponding determined category of the selected email message;

based on communicating the email message, receiving a response associated with the email message, wherein the response is generated based on executing a plurality of out-of-office (OOO) operations associated with the email message category, the response is associated with one of: scheduling meeting data, requesting information data, or task delegation data; and causing display of the response on an email interface.

12. The media of claim 11, wherein the scheduling meeting data comprises a suggestion of availability slots and a calendar link to schedule a meeting.

13. The media of claim 12, wherein the requesting information data comprises links to requested resources.

14. The media of claim 11, wherein the task delegation data comprises an alternative contact associated with performing a task identified in an email message.

15. The media of claim 11, the operations further comprising:

accessing the email message;

determining the email message category for the email message;

based on the email message category, executing the plurality of out-of-office (OOO) operations associated with the email message category;

based on executing the plurality of OOO operations associated with the email message category, generating the response for the email message; and communicating the response to cause display of the response on the email interface.

16. A computer-implemented method, the method comprising:

accessing an email message at an email management engine, wherein the email management engine supports a plurality of categorized email management workflows, wherein a categorized email management workflow comprises a structured, category-specific set of OOO operations that are executed based on a selected email message and a corresponding determined category of the selected email message;

determining an email message category for the email message, wherein the email message category is one of: a scheduling meeting category, a requesting information category, or a task delegation category;

based on the email message category, executing a plurality of out-of-office (OOO) operations associated with the email message category;

based on executing the plurality of OOO operations associated with the email message category, generating a response for the email message, wherein the response is associated with one of: scheduling meeting data, requesting information data, or task delegation data; and communicating the response to cause display of the response on an email interface.

17. The method of claim 16, wherein the email message is associated with an email management engine that operates based on an email management workflow that includes each of: a scheduling workflow, an information request workflow, and a task assignment workflow.

18. The method of claim 17, wherein a scheduling meeting workflow provides real-time availability information and suggests alternative contacts, an information request workflow provides requested data and makes requested data available to users associated with the email management engine, and wherein a task assignment workflow support delegating tasks to users associated with the email management engine.

19. The method of claim 16, wherein the scheduling meeting data comprises a suggestion of availability slots and a calendar link to schedule a meeting, the requesting information data comprises links to requested resources, and the task delegation data comprises an alternative contact associated with performing a task identified in an email message.

20. The method of claim 16, the method further comprising:

based on context-ware OOO assistance feedback data, updating one or more machine learning models associated with the plurality of OOO operations; and generating a subsequent response for a subsequent email message using the one or the one or more updated machine learning models.

\* \* \* \* \*